US011178002B1

(12) United States Patent
Selvaraj

(10) Patent No.: US 11,178,002 B1
(45) Date of Patent: Nov. 16, 2021

(54) AUTONOMOUS ADAPTIVE CONTROLLER FOR ACTIVE WIRELESS LIGHTING COMMUNICATION

(71) Applicant: ABL IP Holding LLC, Atlanta, GA (US)

(72) Inventor: Gomez Sam Selvaraj, Grayson, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/925,743

(22) Filed: Jul. 10, 2020

(51) Int. Cl.
 H04L 12/24 (2006.01)
 H05B 47/19 (2020.01)
 H04L 29/08 (2006.01)

(52) U.S. Cl.
 CPC .......... H04L 41/0668 (2013.01); H04L 41/12 (2013.01); H04L 67/12 (2013.01); H05B 47/19 (2020.01)

(58) Field of Classification Search
 CPC . H04L 67/1042; H04L 69/40; H04L 41/0668; H04L 47/19; H04L 41/12; H04L 67/12; H04L 2012/2841; H04L 12/2803; H04L 2209/80; H04L 12/18; H04L 45/28; H05B 47/19; H05B 47/175; H05B 47/10; H05B 47/155; G06F 3/0658; H04W 84/18; H04W 8/005
 See application file for complete search history.

(56) References Cited

U.S. PATENT DOCUMENTS

| 7,009,980 | B1 * | 3/2006 | Cao ...................... H04L 12/66 370/395.54 |
| 9,100,274 | B1 * | 8/2015 | Ghosh ..................... H04L 49/70 |
| 9,525,725 | B1 * | 12/2016 | Bute ....................... H04L 67/42 |
| 9,820,361 | B1 | 11/2017 | Turvy, Jr. et al. |
| 10,009,986 | B2 | 6/2018 | Turvy, Jr. et al. |
| 10,021,770 | B2 | 7/2018 | Turvy, Jr. et al. |
| 10,172,219 | B2 | 1/2019 | Turvy, Jr. et al. |
| 2005/0198359 | A1 * | 9/2005 | Basani ................... H04L 69/329 709/232 |
| 2014/0126416 | A1 * | 5/2014 | Yu ......................... H04W 4/021 370/254 |

(Continued)

*Primary Examiner* — Backhean Tiv
*Assistant Examiner* — Linh T. Nguyen
(74) *Attorney, Agent, or Firm* — Kilpatrick Townsend & Stockton LLP

(57) ABSTRACT

A method for controlling a wireless lighting control network includes determining, by a first network device, whether a message is received from a control device during a first time interval; in response to determining that the message was not received, transmitting, by the first network device, a message to other network devices to determine whether another network device received the message from the control device; in response to determining, during a second time interval, that the first network device did not receive the message from the control device and did not receive an indication from another network device that the message from the control device was received, transmitting a message to the other network devices to indicate that the first network device is a substitute control device; and periodically transmitting messages to the other network devices indicating that the first network device is an active substitute control device.

21 Claims, 8 Drawing Sheets

(56) References Cited

U.S. PATENT DOCUMENTS

| | | | |
|---|---|---|---|
| 2015/0312140 A1* | 10/2015 | Yang | H04L 12/18 |
| | | | 370/218 |
| 2016/0128168 A1* | 5/2016 | Walker | B60Q 3/30 |
| | | | 315/77 |
| 2016/0150011 A1* | 5/2016 | Le Nerriec | H04N 21/4307 |
| | | | 709/205 |
| 2018/0262566 A1* | 9/2018 | Liu | G06F 12/0246 |
| 2019/0342149 A1* | 11/2019 | Guo | G06F 11/0709 |
| 2020/0036647 A1* | 1/2020 | Gupta | H04L 67/42 |
| 2020/0177674 A1* | 6/2020 | Liu | H04L 67/1038 |

* cited by examiner

AUTONOMOUS ADAPTIVE CONTROLLER FOR ACTIVE WIRELESS LIGHTING COMMUNICATION

BACKGROUND

Unless otherwise indicated herein, the materials described in this section are not prior art to the claims in this application and are not admitted to be prior art by inclusion in this section.

Lighting control networks, once commissioned, can provide autonomous control, for example, occupancy sensing, daylight sensing, etc., of light fixtures and other devices connected to the network. Control of the lighting network may be provided by a device acting as a network coordinator, which may be incorporated into a light fixture connected to the network. The network coordinator may provide instructions to the other network devices to control their operations. When a network coordinator goes offline or otherwise becomes inactive, for example, due to an electrical fault or communication failure, other network devices cannot be controlled until the network coordinator is returned to service.

SUMMARY

Systems and methods for adaptive control of wireless lighting systems are provided.

According to various aspects there is provided a method for controlling a wireless lighting control network. In some aspects, the method may include determining, by a first network device, whether a message is received from a control device for the wireless lighting control network during a first time interval. In response to determining that the message from the control device was not received during the first time interval, transmitting, by the first network device, a message to other network devices to determine whether another network device received the message from the control device during the first time interval. In response to determining, during a second time interval, that the first network device did not receive the message from the control device and did not receive an indication from another network device that the message from the control device was received, transmitting, by the first network device, a message to the other network devices to indicate that the first network device is a substitute control device for the wireless lighting control network; and periodically transmitting, by the first network device, messages to the other network devices indicating that the first network device is an active substitute control device for the wireless lighting control network.

The method may further include performing, by each network device, a check to determine whether the message is received from the control device or the substitute control device at time intervals based at least in part on a node index value and a number of network devices in the network. Each network device may be identified by a unique node index value. The method may further include staggering the time intervals for performing the check by each network device based on a node index value of each network device. The method may further include determining whether the message is received from a control device by examining an indicator set by receipt of the message during the time intervals. A network device that becomes the substitute control device for the network may be an active network device having a lowest node index value.

The method may further include examining, by the first network device, a list of network devices connected to the network, wherein the list includes a unique node index that identifies each network device; determining, by the first network device, whether another network device has a lower node index value than the first network device; and in response to determining that another network device does not have a lower node index value, maintaining operation as the substitute control device for the network.

The method may further include examining, by the first network device, a list of network devices connected to the network, wherein the list includes a unique node index that identifies each network device; determining, by the first network device, whether another network device has a lower node index value than the first network device. In response to determining that another network device has a lower node index value, the method may further include disabling, by the first network device, operation of the first network device as the substitute control device for the network.

According to various aspects there is provided a system. In some aspects, the system may include a wireless lighting control network, a group monitor configured to transmit periodic status and control messages over the network, and a set of network devices in communication with the group monitor via the network. Each network device of the set of network devices may be configured to determine whether a message is received from a control device for the wireless lighting control network during a first time interval. In response to determining that the message from the control device was not received during the first time interval, each network device may be configured to transmit a message to other network devices to determine whether any of the other network devices received the message from the control device during the first time interval. In response to determining, during a second time interval, that the message from the control device was not received and that no indication that the message from the control device was received from another network device, one network device may be configured to transmit a message to the other network devices to indicate that the one network device is a substitute control device for the wireless lighting control network; and periodically transmit messages to the other network devices indicating that the one network device is an active substitute control device for the wireless lighting control network.

Each network device may be identified by a unique node index value, and each network device may perform a check to determine whether the message is received from the control device or the substitute control device at time intervals based at least in part on its node index value and a number of network devices in the network. The time intervals for performing the check by each network device may be staggered based on a node index value of each network device. Determining whether the message is received from a control device may include examining an indicator set by receipt of the message during the time intervals. The network device that becomes the substitute control device for the network may be an active network device having a lowest node index value.

The one network devices may be configured to examine a list of network devices connected to the network. The list includes a unique node index that identifies each network device. The one network devices may be further configured to determine whether another network device has a lower node index value than the network device, and in response to determining that another network device does not have a lower node index value, maintain operation as the substitute control device for the network.

The one network devices may be configured to configured to examine a list of network devices connected to the network. The list may include a unique node index that identifies each network device. The one network devices may be further configured to determine whether another network device has a lower node index value than the network device, and in response to determining that another network device has a lower node index value, disable operation as the substitute control device for the network.

The operations may further include examining, by the one network device, a list of network devices connected to the network, wherein the list includes a unique node index that identifies each network device; determining whether another network device has a lower node index value; and in response to determining that another network device does not have a lower node index value, maintaining operation as the substitute control device for the network.

The operations may further include examining, by the one network device, a list of network devices connected to the network, wherein the list includes a unique node index that identifies each network device; determining whether another network device has a lower node index value; and in response to determining that another network device has a lower node index value, disabling operation of as the substitute control device for the network.

According to various aspects there is provided a non-transitory computer readable medium. In some aspects, the non-transitory computer readable medium may include instructions for causing one or more processors to perform operations for controlling a wireless lighting control network, the operations including determining whether a message is received from a control device for the wireless lighting control network during a first time interval. In response to determining that the message from the control device was not received during the first time interval, the operations may include transmitting a message to other network devices to determine whether any of the other network devices received the message from the control device during the first time interval. In response to determining, during a second time interval, that the message from the control device was not received and that no indication that the message from the control device was received from another network device, transmitting, by one network device, a message to the other network devices to indicate that the one network device is a substitute control device for the wireless lighting control network, and periodically transmitting, by the one network device, messages to the other network devices indicating that the network device is an active substitute control device for the wireless lighting control network.

The operations may further include performing, by each network device, a check to determine whether the message is received from the control device or the substitute control device at time intervals based at least in part on a node index value and a number of network devices in the network. Each network device may be identified by a unique node index value.

The operations may further include staggering the time intervals for performing the check by each network device based on a node index value of each network device, and determining whether the message is received from a control device by examining an indicator set by receipt of the message during the time intervals. A network device that becomes the substitute control device for the network is an active network device having a lowest node index value.

Numerous benefits are achieved by way of the various embodiments over conventional techniques. For example, the various embodiments include methods and systems for providing control of a wireless lighting system network when a primary controller fails. In some embodiments, a network device capable of capable of controlling the wireless network may detect an absence of communication from the primary controller and assume control of the wireless network. In some embodiments, several network devices capable of capable of controlling the wireless network may negotiate to determine a most appropriate controller for the wireless network. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Lighting control networks can include multiple devices such as light fixtures and sensors. Once commissioned, the lighting control network can provide autonomous control of light fixtures and other devices connected to the network. For example, light fixtures may sense occupancy or daylight and adjust their illumination accordingly. A lighting control network may include one coordinator, or group monitor, that may provide control for all of the devices on the network. In a star topology lighting control network, the group monitor may be a light fixture that has a physical location near the center of the star topology network. The central location may facilitate communication between the group monitor and the other network devices. In order to avoid loss of control of the devices on the lighting control network when the group monitor fails, another device should take over control as a new group monitor.

Figure 1:
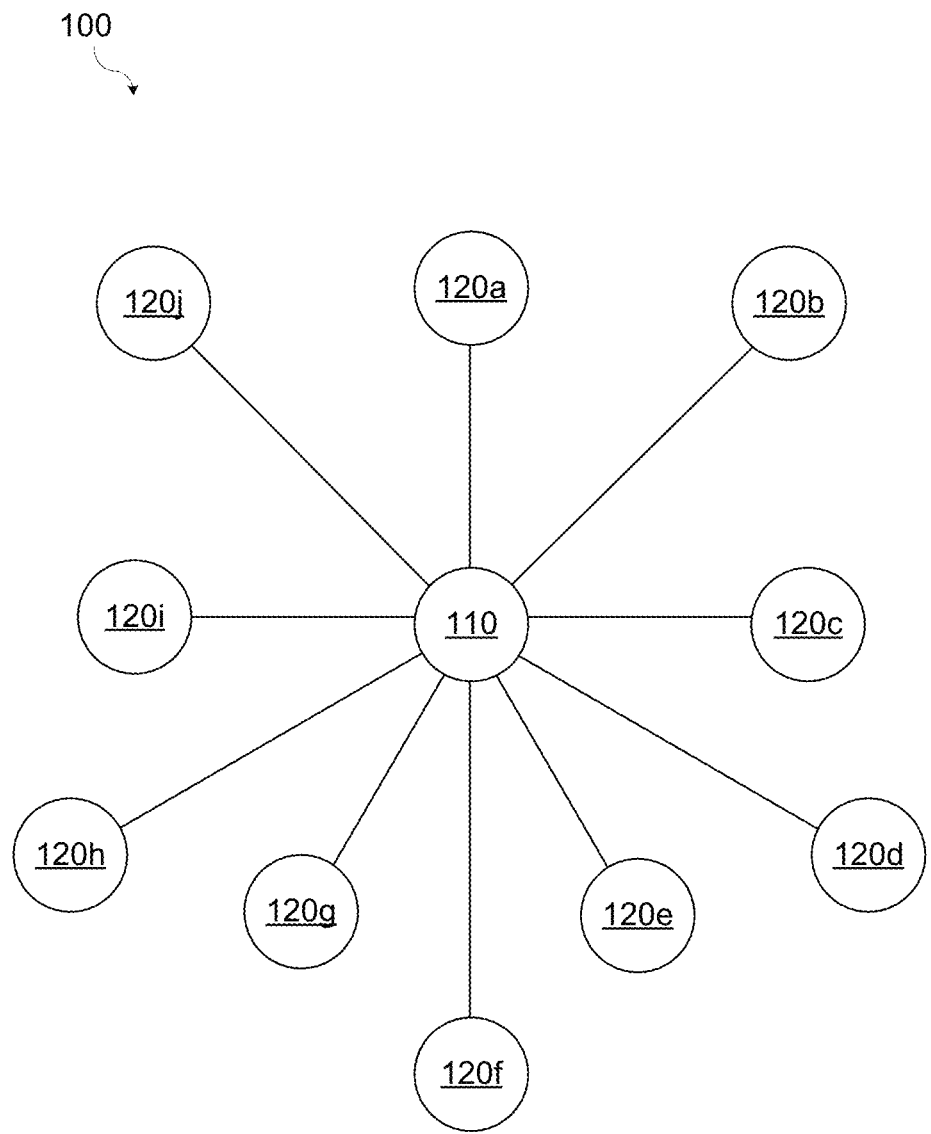
FIG. 1 is a diagram illustrating a star topology lighting control network according to some aspects of the present disclosure.

FIG. 1 is a diagram illustrating an example of a star topology lighting control network 100 according to some aspects of the present disclosure. FIG. 1 illustrates a group monitor 110 that may act as a controller for the lighting control network 100. The group monitor 110 as well as the devices 120a-120j may be light fixtures. The group monitor 110 may be located in proximity to a geographic center of the lighting control network 100. While this location can provide high received signal strength for communication with the other devices 120a-120j, location of the group monitor 110 in proximity to the geographic center of the lighting control network 100 is not required. Once commissioned, the light fixture acting as the group monitor 110 may communicate with the other light fixtures (devices 120a-120j) to provide control instructions. The control instructions may activate or deactivate sensors in the light fixtures, provide illumination schedules, etc.

Figure 2:
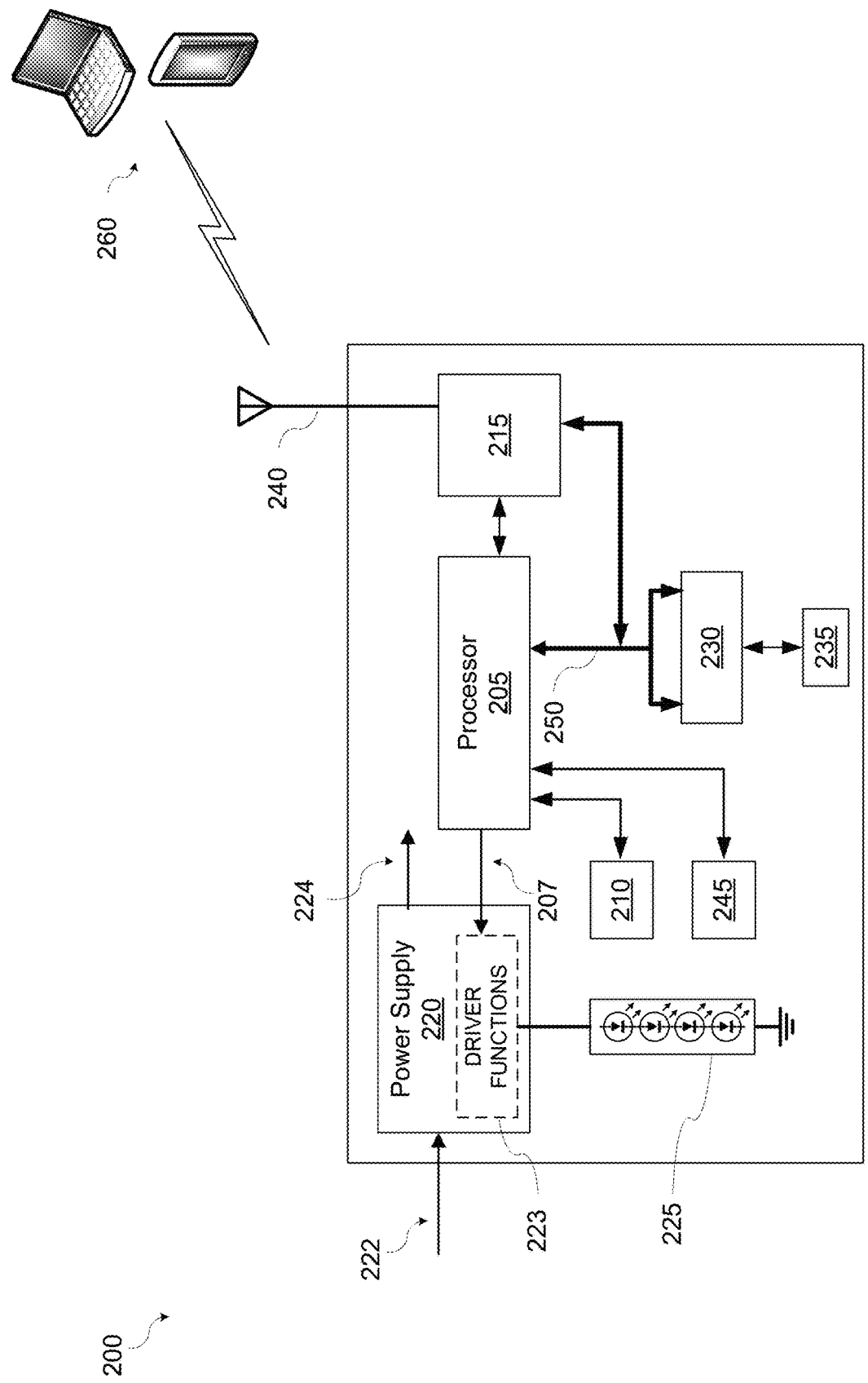
FIG. 2 is a block diagram illustrating an example of a group monitor or other network device capable of providing control for the network according to some aspects of the present disclosure.

FIG. 2 is a block diagram illustrating an example of a group monitor 200 or other network device capable of providing control for the network according to some aspects of the present disclosure. Referring to FIG. 2, the group monitor 200 may include a processor 205, a memory 210, a wireless transceiver 215, a power supply 220, an illumination element 225, a peripheral interface 230, an antenna 240, and a communications bus 250. The antenna 240 may be communicatively coupled to the wireless transceiver 215 and may enable the wireless transceiver 215 to receive configuration settings and control signals, for example, from a mobile device during commissioning, and communicate with other light fixtures and devices in the network.

The processor 205 may be a microprocessor, microcomputer, computer, microcontroller, programmable controller, or other programmable device. The processor 205 may control overall operation of the group monitor. The memory 210 may be processor-readable solid state storage media, for example, but not limited to, RAM, ROM, EEPROM, FLASH memory, or other solid state storage devices that may be used to store desired program code in the form of instructions or data structures and that may be accessed by or operated upon by the processor 205. Alternatively or additionally, the memory 210 may be an internal memory of the processor 205 or a combination of internal memory and external memory.

The power supply 220 may receive alternating current (AC) line power 222 and supply direct current (DC) power 224 to the group monitor 200. The power supply 220 may include driver functions 223 configured to supply power 217 to the illumination element 225 based on control signals 207 from the processor 205. In some embodiments, the power supply and the driver functions may be separate units. In some embodiments, the group monitor 200 may include a back-up power supply unit (not shown), for example, a battery power supply, configured to supply auxiliary DC power to the group monitor 200, including the driver functions 223 of the power supply 220, in the event of AC power loss.

The peripheral interface 230 may provide power (via the processor 205) and communication for various sensors 235, for example, but not limited to, daylight sensors, passive infrared (PIR) sensors, etc. The communications bus 250 may provide communications between the wireless transceiver 215 and the processor 205, and between the processor 205 and the peripheral interface 230. In addition, the communications bus 250 may provide DC power to the sensors 235 connected to the peripheral interface 230.

The transceiver 215 may represent one or more components configured to facilitate a network connection, and may include wired or wireless interfaces. The wireless interfaces may include, for example, wireless interfaces such as IEEE 802.11, Bluetooth, or radio interfaces for accessing cellular telephone networks (e.g., transceiver/antenna for accessing a CDMA, GSM, UMTS, or other mobile communications network). In some embodiments, the wireless transceiver 215 may include a Bluetooth® radio. The wireless transceiver 215 may communicate via one or more wireless protocols, for example, but not limited to, Bluetooth®, Bluetooth® Low Energy (BLE), etc., with a mobile computing device 260 (e.g., a mobile phone, laptop computer, etc.). Other limited range communication technologies and/or protocols may be used without departing from the scope of the present disclosure.

The wireless transceiver 215 may further include a sub-gigahertz band radio for communication with the other devices on the network. The group monitor 200 may communicate the configuration settings as well as control and status messages to the other devices on the network via the sub-gigahertz band radio. The sub-gigahertz band radio may be capable of longer range communication than the Bluetooth® radio.

The group monitor 200 may receive input from a mobile computing device 260, for example, but not limited to, a laptop computer, a mobile phone, or other mobile device, via the Bluetooth® radio wireless transceiver 215. After establishing a communication session between the mobile computing device 260 and the wireless transceiver 215, the mobile computing device 260 may send configuration settings and commands for commissioning of the lighting control network. The processor 205 may store the configuration settings in the memory 210.

The processor 205 of the group monitor 200 may transmit signals indicating the status of the group monitor 200 to the other devices in the network, as well as control signals to control lighting characteristics, for example, but not limited to, light color, color temperature, intensity, light color transitions, dimming levels, or other lighting characteristics, produced by other light fixtures in the network.

The group monitor 200, or another network device capable of providing control for the network, may be referred to herein as a fully functional device (FFD). A fully functional device (FFD) may be a light fixture having Bluetooth or Bluetooth Low Energy (BLE) communication capability and sub-gigahertz communication capability. Thus, an FFD may include a Bluetooth/BLE radio for communication with a mobile device, for example, for commissioning the lighting system, and a sub-gigahertz radio for communication with light fixtures and other devices on the network. Other devices, for example, other light fixtures on the network may be FFDs. Some FFDs may also be referred to herein as sub-monitors.

According to aspects of the present disclosure, when an active group monitor fails, procedures may be implemented by other FFDs on the network to assume control and maintain operation of the wireless lighting control network. Each network device may implement a timer 245 configured to time intervals at which the network device can perform a check to determine whether a group monitor is active on the network. A timer 245 for group monitor may further be configured to time intervals at which the group monitor broadcasts status or control messages. The timer 245 may be implemented by a processor of the network device or may be separate from the processor.

When a light fixture designated as a group monitor (GM) is active, it may periodically broadcast a GM-Active message to the other devices on the network. The time interval for broadcasting the GM-Active message may be a specified time period (e.g., fractions of a second, seconds, etc.). Each time a network device receives a GM-Active message, or another communication such as a control message, from the GM, the network device may set a GM-Active flag in its memory. The GM-Active flag may be one or more bits set in a register, for example, in an internal processor memory or other memory of the network device. The GM may continuously broadcast GM-Active messages and other control messages to the other network devices at the specified time intervals whenever the GM is operational.

Each device in the network that is not the GM may implement a GM-Check timer. Upon expiration of the GM-Check timer, each network device may determine whether it's GM-Active flag has been set as a result of receiving a GM-Active message or another communication from the GM indicating that the GM is operational. Each network device may reset its GM-Check timer when the GM-Check timer expires. The time interval for the GM-Check timer of each network device may span several of the time periods during which the GM broadcasts GM-Active messages.

The GM-Check timer interval may be the same for each device on the network, but the time intervals may be staggered to avoid collisions when messages are transmitted by the network devices. A network device may (or may not) transmit a unicast, multicast, or broadcast message upon expiration of the GM-Check timer interval. Each device in the lighting control network may be identified with identification information, for example, a unique node index indicating its rank in the network, in a group table that lists all the devices in the network. Each device in the lighting control network may have access to the group table. For example, the group table may be stored in memory of each network device.

The rank of a network device in the network (node index) indicated in the group table may be based, at least in part, on the proximity of the device to the geographic center of the network. For a star topology network, messages transmitted by a network device closer to the geographic center of the network may generally be received with higher signal strength by network devices closer to the geographic edges of the network. Therefore, network devices closer to the geographic center of the network may have a lower node index than network devices further from the geographic center of the network, and may be more likely to assume control of the network in the event of a failure of the Group Monitor.

The GM-Check timer intervals for each device in the network may be staggered based on the node index of the device, as well as the count of devices in the network and a timeout period. The timeout period may be a predetermined time interval specified for the network devices. The specified timeout period may be the same for each network device. The staggering of the time for each network device to check for an active group monitor (e.g., the GM-Check timer interval) may be given by Equation 1:

$$\text{GM-Check timer interval} = (\text{Node Index} + 1) * \text{Specified Timeout Period} \quad (1)$$

A next slot for the first network device in the group table may occur after the GM-Check timer intervals for all of the network devices, and may be given by Equation 2:

$$\text{Next slot} = (\text{Group Count} + 2) * \text{Specified Timeout Period} \quad (2)$$

Table 1 illustrates an example for a network having three fixtures including the GM, with a Specified Timeout Period equal to five minutes. It should be noted that the node index of the GM is zero; therefore, based on the node indexes, the group count for this example is 2.

TABLE 1

| Node Index | Status | New Timeout for AGM check |
|---|---|---|
| 0 | Group Monitor | |
| 1 | Node 1 | GM-Check timer interval = (1 + 1) * 5 min = 10 min<br>Next slot = (2 + 2) * 5 min = 20 min |
| 2 | Node 2 | GM-Check timer interval = (2 + 1) * 5 min = 15 min<br>Next slot = (2 + 2) * 5 min = 20 min |

Thus, in the example of Table 1, the first fixture (node index 1) will perform a first check for a GM-Active messages 10 minutes after commissioning, and will perform a next check for a GM-Active messages 30 minutes after commissioning. The second fixture (node index 2) will perform a first check for a GM-Active messages 15 minutes after commissioning, and will perform a next check for a GM-Active messages 35 minutes after commissioning. Checking for GM-Active messages will continue in this manner while the network devices are operational. While the above example illustrates the concept of staggering of the time for each network device to check for an active group monitor using only three devices for ease of explanation, any number of devices may be employed. Further, the time periods are merely exemplary for ease of explanation. Different time periods may be used without departing from the scope of the present disclosure.

Figure 3:
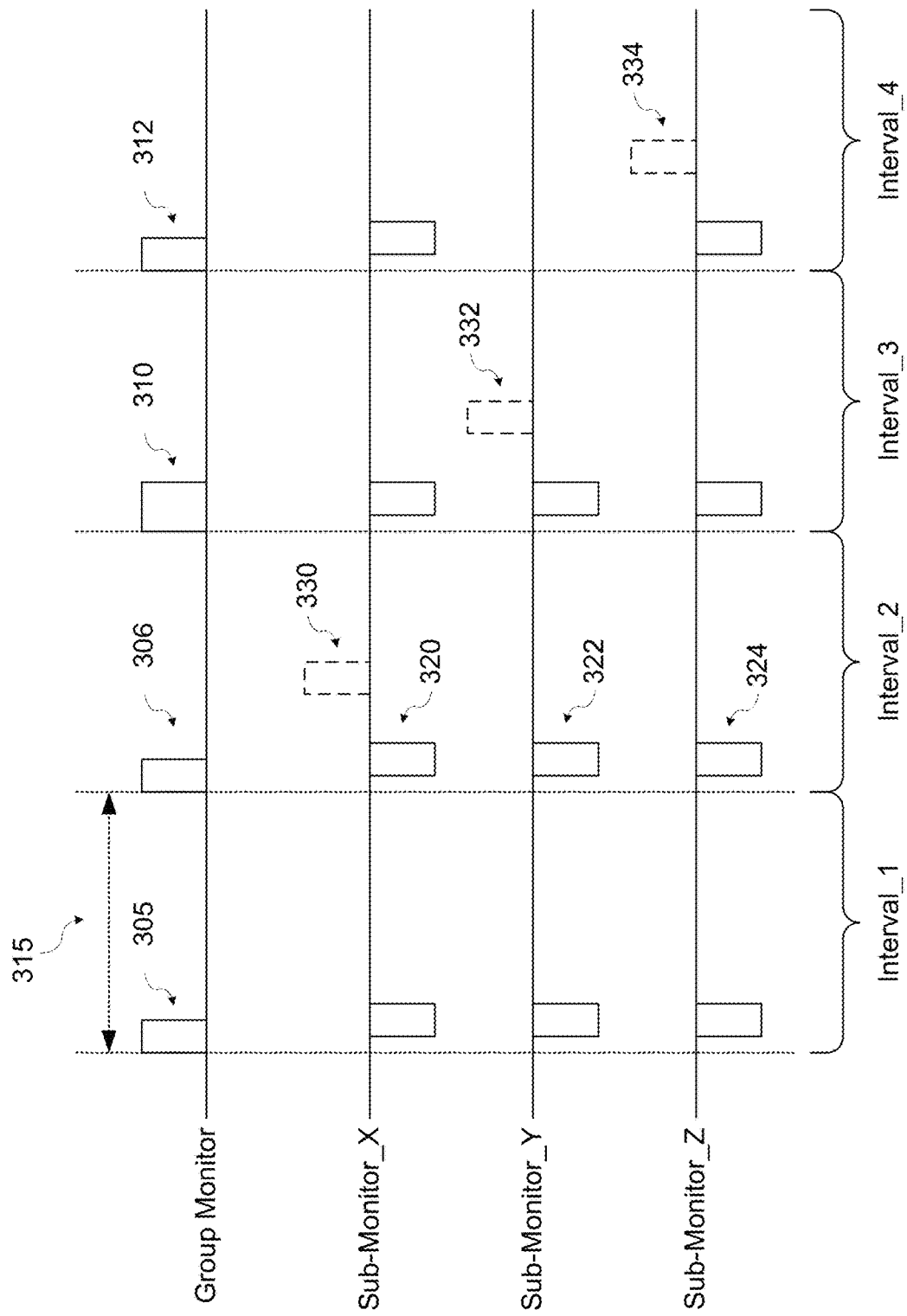
FIG. 3 is an example of a timing flow diagram for devices on a wireless lighting network according to some aspects of the present disclosure.

FIG. 3 is an example of a timing flow diagram for devices on a wireless lighting network according to some aspects of the present disclosure. As shown in FIG. 3, an active group monitor may broadcast a GM-Active message 305 or other message, for example, a control message 310, at every status time interval 315. FIG. 3 illustrates that during Interval_1 and Interval_2, Sub-Monitor_X, Sub-Monitor_Y, and Sub-Monitor_Z may respectively receive 320, 322, 324 the status message 306 broadcast by the group monitor. Each time a sub-monitor receives a GM-Active message or other message from the group monitor, the sub-monitor sets a GM-Active flag. The GM-Active flag may be set by receipt of a GM-Active message or other message during any time interval between the GM-Check timer interval for a sub-monitor.

At each GM-Check timer interval, the sub-monitor performs a GM-Check check 330 to determine whether the GM-Active flag has been set. As explained above, the GM-Check timer intervals for the sub-monitors may be staggered. FIG. 3 illustrates that Sub-Monitor_X may perform a GM-Check 330 during Interval_2, Sub-Monitor_Y, may perform a GM-Check 332 during Interval_3 and Sub-Monitor_Z may perform a GM-Check 334 during Interval_4. A GM-Active flag that is set indicates to the sub-monitor that the group monitor is actively controlling the wireless lighting network. When the GM-Active flag has been set, the sub-monitor may clear the flag during the GM-Check. During Interval_3, Sub-Monitor_Y may clear the previously received GM-Active flag during its GM-Check 332. During Interval_4, Sub-Monitor_Y may fail to receive the GM-Active message 312 broadcast by the Group Monitor, for example, as a result of a communication failure or other reason. Therefore, the GM-Active flag for Sub-Monitor_Y may not be set.

Figure 4:
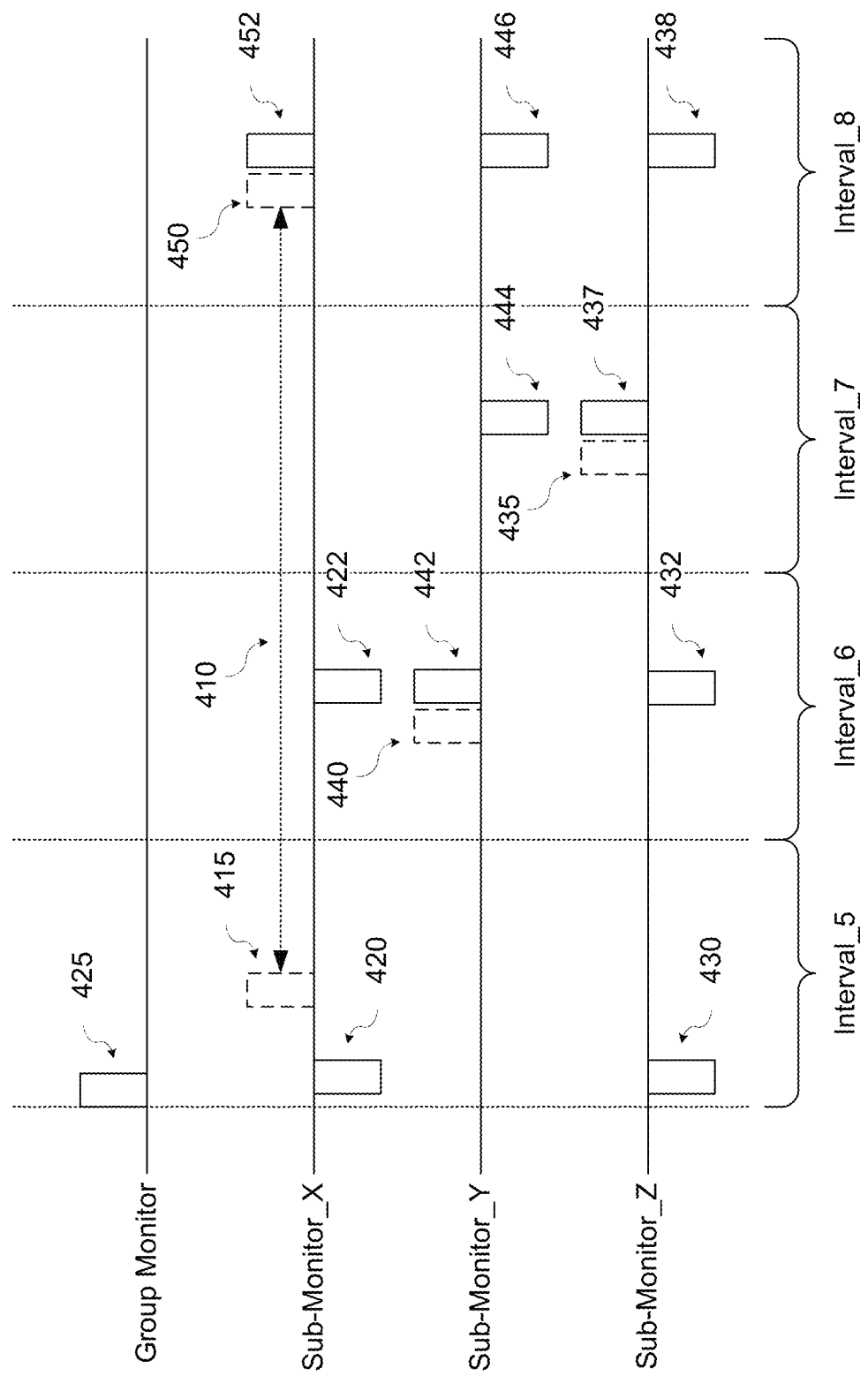
FIG. 4 is a continuation of the example of the timing flow diagram of FIG. 3 according to some aspects of the present disclosure.

FIG. 4 is a continuation of the example of the timing flow diagram of FIG. 3 according to some aspects of the present disclosure. FIG. 4 shows a GM-Check timer interval 410 for Sub-Monitor_X. As can be seen in FIG. 4, the GM-Check timer interval 410 spans several time intervals during which an active group monitor may transmit GM-Active messages or other messages. FIG. 4 also illustrates that the GM-Active flag for Sub-Monitor_X would be set by receipt 420 of the GM-Active message 425 and cleared by the GM-Check 415 during Interval_5 after receiving 420 the GM_active message 425 during Interval_5. Sub-Monitor_Z may also receive 430 the GM-Active message 425 during Interval_5, thereby setting its GM-Active flag. Sub-Monitor_Y, however, may fail to receive the GM-Active message 425.

Since Sub-Monitor_Y failed to receive a GM-Active message or other message from the Group Monitor during its GM-Check timer interval (beginning in Interval_4 in FIG. 3), Sub-Monitor_Y may determine that its GM-Active flag is not set during its GM-Check 440 in Interval_6. Sub-Monitor_Y may then broadcast a GM-Active-Check message 442 to determine whether other devices received a GM-Active message that was missed by Sub-Monitor_Y. Sub-Monitor_X may receive 422 the GM-Active-Check message 442 and Sub-Monitor_Z may receive 432 the GM-Active-Check message 442 during Interval_6.

Sub-Monitor_Z may have received 430 the GM-Active message 425 broadcast by the Group Monitor during Interval_5. Therefore, at its next GM-Check 435 during Interval 7, Sub-Monitor_Z may determine that its GM-Active flag was set, and may unicast a GM-Alive message 437 to Sub-Monitor_Y indicating that the Group Monitor is still active. The GM-Alive message 437 may be received 444 by Sub-Monitor_Y during its GM-Check timer interval and may cause the GM-Active flag for Sub-Monitor_Y to be set.

As can also be seen in FIG. 4, the Group Monitor has ceased broadcasting GM_Active or other messages after Interval_5. Therefore, none of the sub-monitors receives another message from the Group Monitor during their GM-Check timer intervals after Interval_5.

During Interval 8, at the GM-Check 450 at the end of the GM-Check timer interval 410, Sub-Monitor_X may determine that its GM-Active flag is not set. The GM-Active flag for Sub-Monitor_X may not be set since a GM-Active message has not been received from the Group Monitor, and a GM-Active status message has not been received from another sub-monitor (the GM-Active status message was unicast by Sub-Monitor_Z to Sub-Monitor_Y during Interval_7). Thus, Sub-Monitor_X may determine that the Group Monitor is not active, and since it has the lowest ranking among the sub-monitors (e.g., the lowest node index as explained above), may broadcast a GM-Active-Check message 452 during Interval_8. Sub-Monitor_Y may receive 422 the GM-Active-Check message 452 and Sub-Monitor_Z may receive 438 the GM-Active-Check message 452 during Interval_8. Since only one sub-monitor can assume the role of Group Monitor, the active sub-monitor having the lowest ranking, e.g., the active sub-monitor closest to the geographic center of the network, may transmit messages with the strongest signal to devices at the edges of the network.

Figure 5:
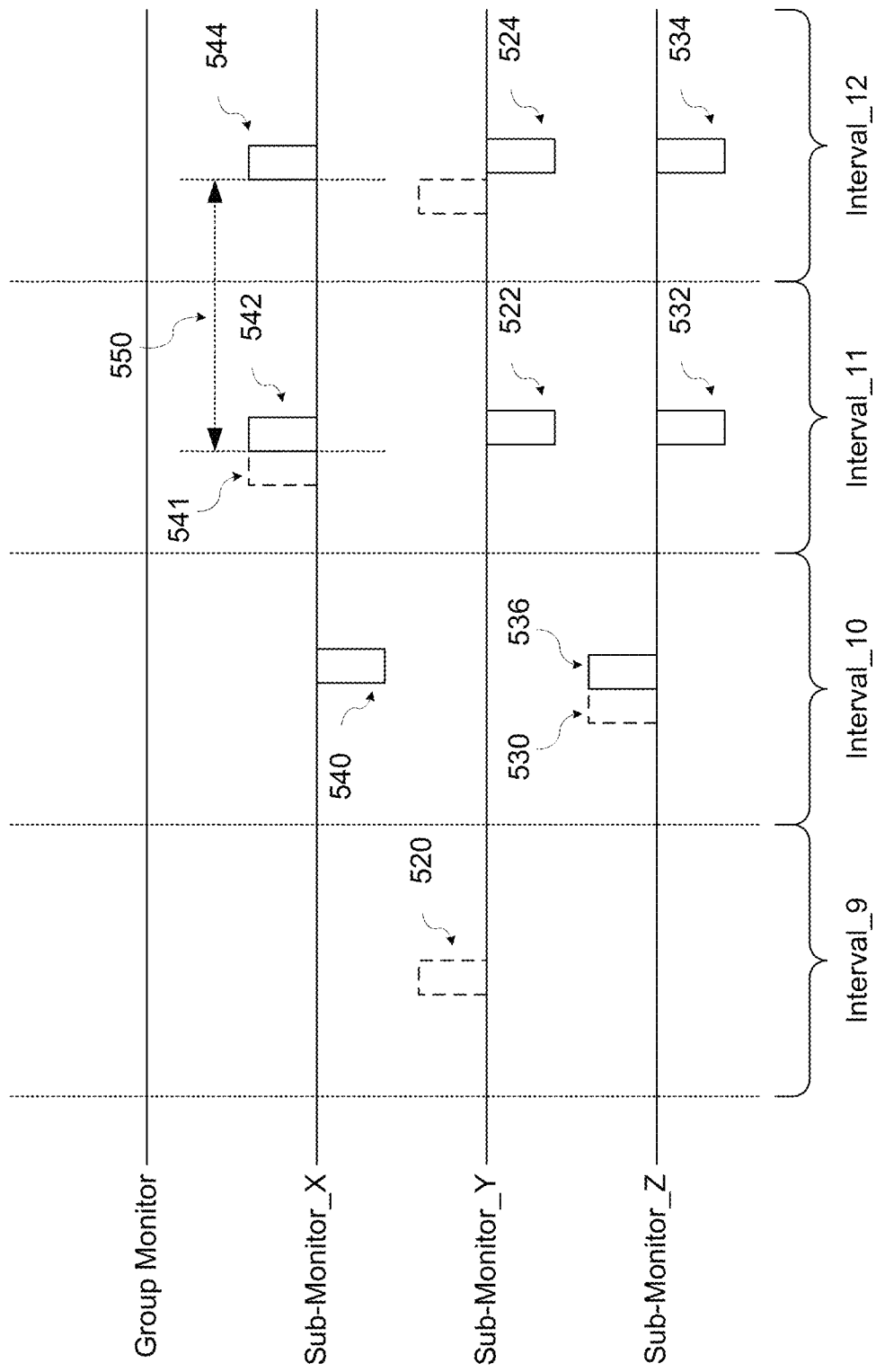
FIG. 5 is a continuation of the example of the timing flow diagram of FIGS. 3-4 according to some aspects of the present disclosure.

FIG. 5 is a continuation of the example of the timing flow diagram of FIGS. 3-4 according to some aspects of the present disclosure. In Interval_9, since Sub-Monitor_Y received the unicast GM-Active status message from Sub-Monitor_Z during Interval_7 (during the GM-Check timer interval for Sub-Monitor_Y), at the GM-Check 520, Sub-Monitor_Y may determine that its GM-Active flag is set indicating that the Group Monitor is active, and may not respond to the GM-Active-Check message 452 received from Sub-Monitor_X during Interval_8. In Interval_10, at its GM-Check 530, Sub-Monitor_Z may determine that its GM-Active flag is not set since a GM-Active message has not been received from the Group Monitor, and a GM-Active status message has not been received from another sub-monitor. Sub-Monitor_Z may then send a unicast GM-Inactive message 536 to Sub-Monitor_X. Sub-Monitor_X may receive 540 the GM-Inactive message 536 during Interval_10.

During Interval_11, after its GM-Check 541, having received the GM-Inactive message 536 from Sub-Monitor_Z during Interval_10, Sub-Monitor_X, may determine that it is the lowest ranking sub-monitor and may broadcast a Substitute-GM message 542 indicating that it is now the substitute group monitor. Sub-Monitor_Y may receive 522 the Substitute-GM message 542 and Sub-Monitor_Z may receive 432 the Substitute-GM message 542 during Interval_11. Thereafter, Sub-Monitor_X, may broadcast GM-Active messages 544 at every status time interval 550. The GM-Active messages 544 may be received 524 by Sub-Monitor_Y and may be received 534 by Sub-Monitor_Z.

Figure 6:
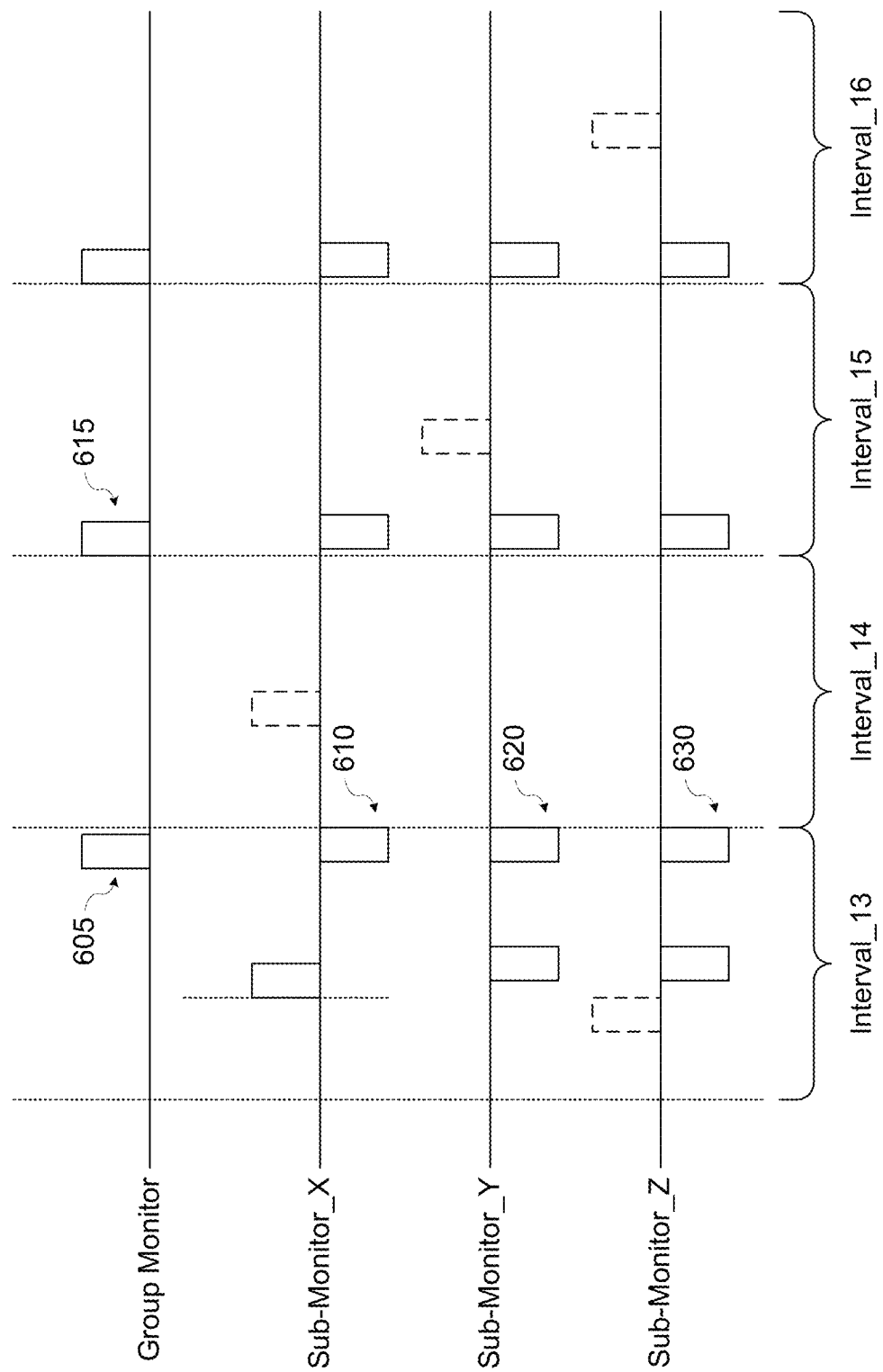
FIG. 6 is a continuation of the example of the timing flow diagram of FIGS. 3-5 according to some aspects of the present disclosure.

FIG. 6 is a continuation of the example of the timing flow diagram of FIGS. 3-5 according to some aspects of the present disclosure. Continuing with the example, during Interval 13, the Group Monitor may awaken and broadcast a GM-Active message 605 which may be received 610 by Sub-Monitor_X, received 620 by Sub-Monitor_Y, and received 630 by Sub-Monitor_Z. Upon receiving the GM-Active message 605 from the Group Monitor, Sub-Monitor_X may disable its function of acting as the GM for the network to return control of the network to the Group Monitor. The Group Monitor may resume broadcasting GM-Active messages 615 every status time interval. Whenever the group monitor switches to a different device, each network device may update an alias for the device assuming the Group Monitor functionality in its group table.

Each network device may be configured to utilize status bits, or flags, that may be set or cleared based on the state of the network as well as its own state. For example, based on which flags are set, a network device can determine whether a Group Monitor has ceased operating. Flags may be set and cleared by a network device based on the occurrence of various events.

A GM-Active flag indicating that the Group Monitor is active may be set by a device when a GM-Active message is received from the GM during the GM-Check timer interval of the device. The GM-Active flag may not be set if a GM-Active message is not received from the GM during the GM-Check timer interval. The device may clear the GM-Active flag when its GM-Check timer interval expires. Referring to FIG. 3, the GM-Active flag may be set by Sub-Monitor_X upon receiving 320 the status message 306 (or the GM-Active message 305) from the Group Monitor. The GM-Active flag may be cleared when Sub-Monitor_X performs a GM-Check 330 when its GM-Check timer interval expires.

A GM-Missing flag may be set by a network device when a GM-check message is broadcast by the device as a result of a GM-Active message not being received from the GM during the GM-Check timer interval of the device. The GM-Missing flag may be cleared when a response to the GM-check message is received from another device. Referring to FIG. 4, Sub-Monitor_Y may determine that its GM-Active flag was not set during its GM-Check 440. Sub-Monitor_Y may set its GM-Missing flag when it broadcasts a GM-Active-Check message 442 to determine whether other devices received a GM-Active message that was missed by Sub-Monitor_Y. Sub-Monitor_Y may clear its GM-Missing flag upon receipt 444 of a GM-Alive message 437 from Sub-Monitor_Z.

A GM-Missed flag may be set by a network device when a GM-check message is received from another device. The network device may save the transmit ID (Tx ID) of the other device that caused the GM-Missed flag to be set. The GM-Missed flag may be cleared by the network device when it unicasts a GM-Alive message to the other device that sent the GM-check message. Referring to FIG. 4, Sub-Monitor_X may set its GM-Missed flag upon receipt 422 of the GM-check message 442 broadcast by Sub-Monitor_Y and may save the Tx ID of Sub-Monitor_Y in memory. Sub-Monitor_Z may also set its GM-Missed flag upon receipt 432 of the GM-check message 442 broadcast by Sub-Monitor_Y and may save the Tx ID of Sub-Monitor_Y in memory. Since Sub-Monitor_Z received 430 the GM-Active message 425 during its GM-Check timer interval, the GM-Active flag for Sub-Monitor_Z may be set. Upon its GM-Active check at the end of the GM-Check timer interval 435, Sub-Monitor_Z may unicast 437 a GM-Alive message to Sub-Monitor_Y indicating that the Group Monitor is active and may clear its GM-Missed flag. The GM-Alive message may be received 444 by Sub-Monitor_Y, and Sub-Monitor_Y may clear its GM-Missing flag.

The state of the flags may enable a network device to determine whether it should assume control of the network when the Group Monitor becomes inactive. Referring to FIGS. 4 and 5, during its GM-Check timer interval 410, Sub-Monitor_X may not receive a GM-Active message and may receive 422 a GM-check message 442 broadcast by Sub-Monitor_Y. Upon receipt of the GM-check message 442 from Sub-Monitor_Y during Interval_6, Sub-Monitor_X may set its GM-Missed flag may save the Tx ID of Sub-Monitor_Y in memory. Since Sub-Monitor_X did not receive a GM-Active message, Sub-Monitor_X may set its GM-Missing flag when it broadcasts a GM-Active-Check message 452 during Interval_8 to determine whether other devices received a GM-Active message that was missed by Sub-Monitor_X.

Accordingly, the state of the flags for Sub-Monitor_X may be GM-Active flag not set and GM-Missing flag set because Sub-Monitor_X did not receive a GM-Active message, and GM-Missed flag set because Sub-Monitor_Y did not receive a GM-Active message. During Interval_10, Sub-Monitor_X may receive 540 a GM-Inactive message 536 from Sub-Monitor_Z indicating that Sub-Monitor_Z also did not receive a GM-Active message during its previous GM-Check timer interval. Sub-Monitor_X may set its GM-Inactive flag indicating that Sub-Monitor_Z also did not receive a GM-Active message. At the end of its own GM-Check timer interval during Interval_11, the state of the flags (GM-Active=cleared, GM-Missing=set, GM-Missed=set, GM-Inactive=set) for Sub-Monitor_X indicate that it has not received a GM-Active message for its previous two GM-Check timer intervals, and both Sub-Monitor_Y and Sub-Monitor_Z have not received a GM-Active message. Sub-Monitor_X therefore broadcasts a Substitute-GM message 542 indicating to the other network devices that it is assuming control of the network.

Figure 7:
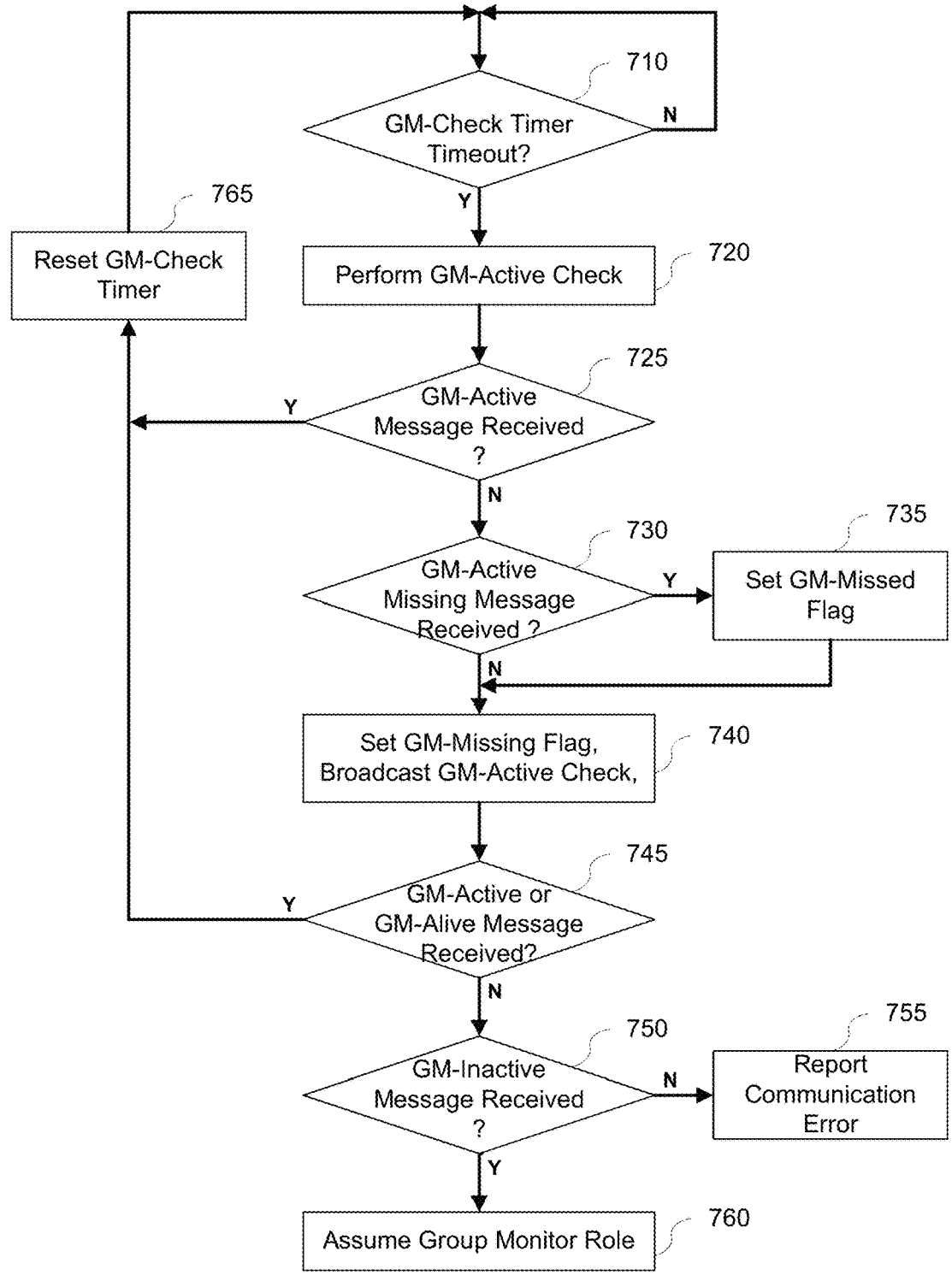
FIG. 7 is a flowchart illustrating an example of a method for determining whether a group monitor is active according to various aspects of the present disclosure.

FIG. 7 is a flowchart illustrating an example of a method 700 for determining whether a group monitor is active according to various aspects of the present disclosure. Referring to FIG. 7, at block 710, the network device (e.g., a FFD) may determine whether the GM-Check Timer has timed out. The GM-Check Timer times the GM-Check timer interval for the network device. During the GM-Check timer interval, the network device may receive various messages from the Group Monitor or other network devices. The network device may check for these receipt of any messages and transmit any messages of its own at the end of the GM-Check timer interval. The GM-Check timer intervals for the various network devices may be staggered as described above.

In response to determining that the GM-Check Timer did not timeout (710-N), the method may continue to check the status of the GM-Check Timer.

In response to determining that the GM-Check Timer timed out (710-Y), at block 720, the network device may perform a GM-Active Check. When the GM-Check Timer times out (e.g., at the end of the GM-Check timer interval), the network device may check the status of the GM-Active flag, as well as the status of other flags indicating whether messages have been received during the previous GM-Check timer interval. The status of the GM-Active flag may indicate whether the Group Monitor for the network is active.

At block 725, the network device may determine whether a GM-Active message has been received during its previous GM-Check timer interval. The network device may check the status of the GM-Active flag to determine whether the GM-Active message has been received. When the GM-Active flag is set, a GM-Active message may have been received by the network device during the previous GM-Check timer interval.

In response to determining that a GM-Active message has been received (725-Y), at block 765, the network device may reset its GM-Check timer and the method may continue at block 710. When the network device determines that the GM-Active flag was set during its previous GM-Check timer interval, it knows that the Group Monitor is active and in control of the lighting control network. The network device may reset its GM-Check timer at block 765 to continue the method for the next GM-Check timer interval.

In response to determining that a GM-Active message has not been received (725-N), at block 730, the network device may determine whether a GM-Active Check message was broadcast. The GM-Active Check message may be broadcast by another network device because it did not receive the GM-Active message from the Group Monitor during its preceding GM-Check timer interval.

In response to determining that the GM-Active Check message was broadcast (730-Y), at block 735, the network device may set the GM-Active Missed flag indicating that at least one other network device did not receive a GM-Active message from the Group Monitor; therefore, the Group Monitor may not be active.

In response to determining that a GM-Active Check message has not been broadcast (730-N), at block 740, the network device may set its own GM-Missing Flag. At the end of its GM-Check timer interval, after performing the GM-Active Check, the network device may set its GM-Missing Flag and broadcast a GM-Active Check message.

The network device may reset its GM-Check timer and listen for network communications for the next GM-Check timer interval.

At block 745, the network device may determine whether a message indicating that the Group Monitor is active has been received. At the end of its GM-Check timer interval, the network device may check the GM-Active flag status to determine whether a GM-Active message has been received from the Group Monitor and the GM-Missed flag status to determine whether a GM-Alive message has been received from another network device. The GM-Active flag being set may indicate that a GM-Active message was received from the Group Monitor, and a previously set GM-Missed flag being cleared may indicate that a GM-Alive message was received from another network device.

In response to determining that a message indicating that the Group Monitor is active has been received (745-Y), at block 765, the network device may reset its GM-Check timer and the method may continue at block 710. When the network device determines that the GM-Active flag was set or a GM-Missed flag was cleared during its previous GM-Check timer interval, it knows that the Group Monitor is active and in control of the lighting control network. The network device may reset its GM-Check timer at block 710 to continue the method for the next GM-Check timer interval.

In response to determining that a message indicating that the Group Monitor is active has not been received (745-N), at block 750, the network device may determine whether a GM-Inactive message has been received. The network device may determine whether its GM-Inactive flag was set during its previous GM-Check timer interval. The GM-Inactive flag may be set by when a GM-Inactive message is received from another network device in response to the GM-Active Check message broadcast by the network device.

In response to determining that a GM-Inactive message was not received (750-N), at block 755, the network device may report a communication error. Since the network device did not receive either a message indicating that the Group Monitor was active or a message indicating that the Group Monitor was inactive, the network device may determine that communication failed and report the communication failure. The network device may broadcast a message to the other network devices upon expiration of its GM-Check timer interval indicating the communication failure.

In response to determining that a GM-Inactive message was received (750-Y), at block 760, the network device may assume the role of Group Monitor. The network device may broadcast a Substitute-GM message indicating that it is now the Group Monitor. Thereafter, the substitute Group Monitor may broadcast GM-Active messages at every status time interval According to aspects of the present disclosure, the lowest ranked FFD (e.g., the network device having the lowest node index in the Group Table) may assume control of the network when it is determined that the Group Monitor is no longer active. The lowest ranked FFD may be a network device near the geographical center of the star network and may therefore messages transmitted by the lowest ranked FFD as the substitute group monitor may be received with the highest received signal strength (RSS) by the other devices on the network.

Figure 8:
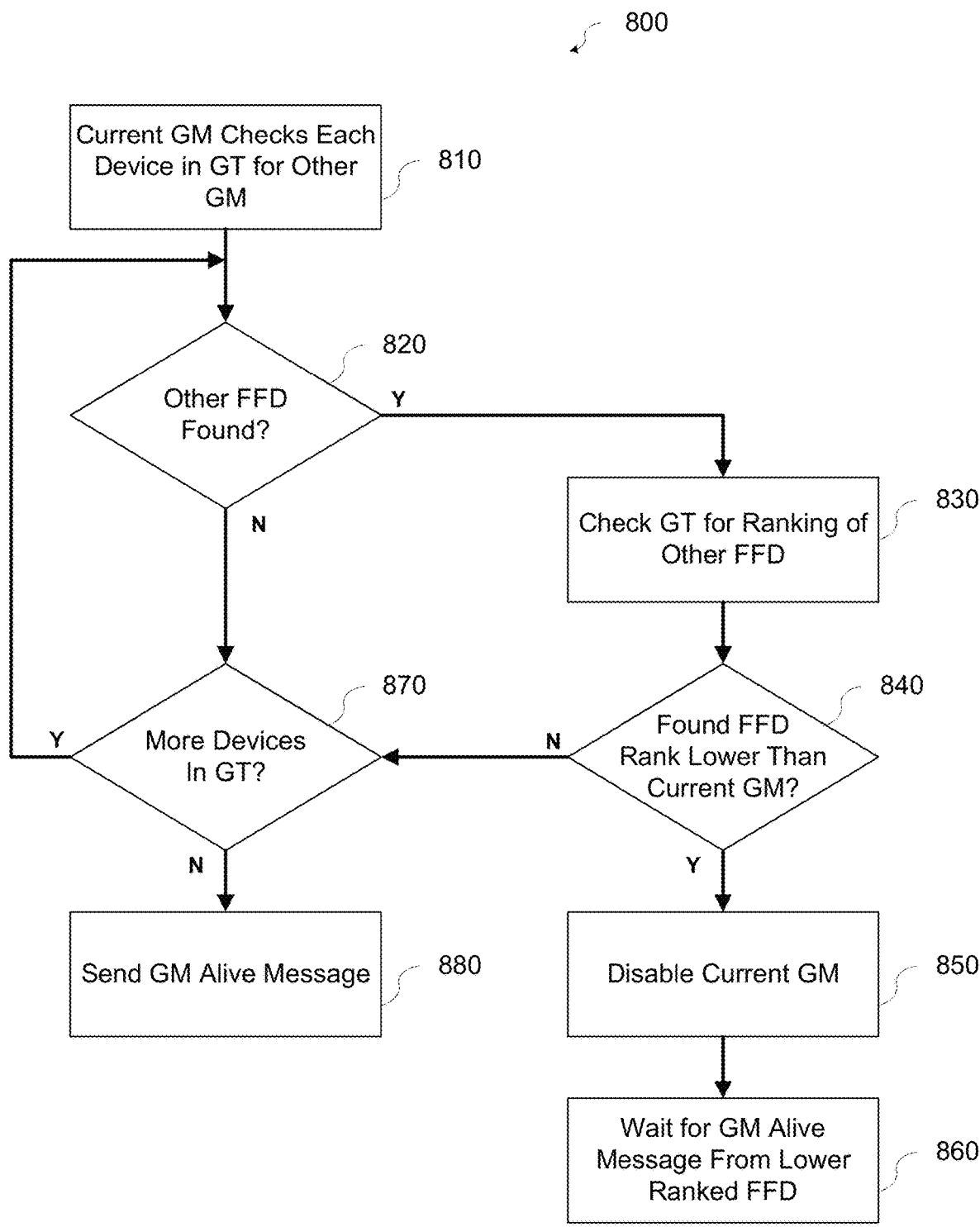
FIG. 8 is a flowchart illustrating an example of a method for determining a substitute group monitor according to various aspects of the present disclosure.

FIG. 8 is a flowchart illustrating an example of a method 800 for determining a substitute group monitor according to various aspects of the present disclosure. At block 810, a current group monitor (GM) may check each device in the group table (GT) to determine whether there are other devices in the network that can act as a GM. Each device in the network may be listed in the GT together with additional information about the device, including whether the device is a fully functional device (FFD) capable of acting as a GM, and a ranking (e.g., node index) of the device with respect to its capability and physical location in the network. In a network having a star topology, FFDs located physically closer to the center of the star network may have a lower ranking than devices further from the center of the network. A lower ranking may be indicated by a lower node index. For example, an FFD having a node index of two would have a lower ranking that an FFD having a node index of four. A group monitor may have a node index of zero.

At block 820, it may be determined whether another FFD is found. The current GM may examine the GT to determine whether a next device listed in the GT is a FFD capable of acting as a GM is available on the network.

In response to determining that the next device listed in the GT is a FFD capable of acting as a GM (820-Y), at block 830, the current GM may check the ranking (e.g., node index) of the found FFD to determine whether it ranks lower than the found FFD. The current GM may inspect the GT to determine the ranking of the found FFD and compare the ranking of the found FFD to its own ranking.

At block 840, it may be determined whether the found FFD ranks lower than the current GM. In response to determining that the found FFD ranks lower (e.g., has a lower node index) than the current GM (840-Y), at block 850, the current GM may disable its function of acting as the GM for the network. The lower ranking FFD may broadcast a GM-Active message indicating to the other devices that it is now the GM. The lower ranking FFD may be preferred as an acting GM since a lower ranking FFD may be closer to the geographic center of the network. Being closer to the geographic center of the network may enable the lower ranking FFD to transmit messages to the edges of the network with sufficient signal strength for edge devices to receive the messages.

At block 860, the former GM may wait to receive a GM-Active message from a lower ranked FFD. The lower ranked FFD may assume the role of GM for the network and may send the GM-Active message to the other network devices. The former GM may resume functioning as any other FFD on the network.

Returning to block 840, in response to determining that the found FFD does not rank lower than the current GM (840-N), at block 870, it may be determined whether there are more devices listed in the GT. The current GM may continue to examine the GT for another FFD capable of acting as a GM. In response to determining that there are more devices in the GT (870-Y), the method may return to block 820 to determine whether a found device is a FFD.

In response to determining that there are no more devices listed in the GT (870-N), the current GM may send a GM-Active message to the other devices on the network. The current GM has established that it is the lowest-ranking FFD currently alive on the network, and maintains the role of GM to provide control of the other devices on the network.

Similarly, at block 820, in response to determining that the next device listed in the GT is not a FFD capable of acting as a GM (820-N), at block at block 870, it may be determined whether there are more devices listed in the GT. The current GM may continue to examine the GT to for another FFD capable of acting as a GM. In response to determining that there are more devices in the GT (870-Y), the method may return to block 820 to determine whether a found device is a FFD.

In response to determining that there are no more devices listed in the GT (870-N), the current GM may send a GMActive message to the other devices on the network. The current GM has established that it is the lowest-ranking FFD currently alive on the network, and maintains the role of GM to provide control of the other devices on the network.

It should be appreciated that the specific steps illustrated in FIG. 8 provide a particular method for determining a group monitor for a wireless lighting network according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. For example, although an implementation using lighting fixtures has been used for illustration, the invention may be extended to any type of emergency units and any type of test or test schedule.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for controlling a wireless lighting control network, the method comprising:
   determining, by a first network device, whether a message is received from a control device for the wireless lighting control network during a first time interval;
   in response to determining that the message from the control device was not received during the first time interval, transmitting, by the first network device, a message to other network devices to determine whether another network device received the message from the control device during the first time interval;
   in response to determining, during a second time interval, that the first network device did not receive the message from the control device and did not receive an indication from another network device that the message from the control device was received, transmitting, by the first network device, a message to the other network devices to indicate that the first network device is a substitute control device for the wireless lighting control network; and
   periodically transmitting, by the first network device, messages to the other network devices indicating that the first network device is an active substitute control device for the wireless lighting control network.

2. The method of claim 1, further comprising:
   performing, by each network device, a check to determine whether the message is received from the control device or the substitute control device at time intervals based at least in part on a node index value and a number of network devices in the network,
   wherein each network device is identified by a unique node index value.

3. The method of claim 2, further comprising:
   staggering the time intervals for performing the check by each network device based on a node index value of each network device.

4. The method of claim 2, further comprising:
   determining whether the message is received from a control device by examining an indicator set by receipt of the message during the time intervals.

5. The method of claim 2, wherein a network device that becomes the substitute control device for the network is an active network device having a lowest node index value.

6. The method of claim 1, further comprising:
   examining, by the first network device, a list of network devices connected to the network, wherein the list includes a unique node index that identifies each network device;
   determining, by the first network device, whether another network device has a lower node index value than the first network device; and
   in response to determining that another network device does not have a lower node index value, maintaining operation as the substitute control device for the network.

7. The method of claim 1, further comprising:
   examining, by the first network device, a list of network devices connected to the network, wherein the list includes a unique node index that identifies each network device;
   determining, by the first network device, whether another network device has a lower node index value than the first network device; and
   in response to determining that another network device has a lower node index value, disabling, by the first network device, operation of the first network device as the substitute control device for the network.

8. A system comprising:
   a wireless lighting control network;
   a group monitor configured to transmit periodic status and control messages over the network; and
   a set of network devices in communication with the group monitor via the network, wherein each network device of the set of network devices is configured to:
   determine whether a message is received from a control device for the wireless lighting control network during a first time interval; and
   in response to determining that the message from the control device was not received during the first time interval, transmit a message to other network devices to determine whether any of the other network devices received the message from the control device during the first time interval;
   in response to determining, during a second time interval, that the message from the control device was not received and that no indication that the message from the control device was received from another network device, one network device may be configured to:

transmit a message to the other network devices to indicate that the one network device is a substitute control device for the wireless lighting control network; and periodically transmit messages to the other network devices indicating that the one network device is an active substitute control device for the wireless lighting control network.

9. The system of claim 8, wherein each network device is identified by a unique node index value, and each network device performs a check to determine whether the message is received from the control device or the substitute control device at time intervals based at least in part on its node index value and a number of network devices in the network.

10. The system of claim 9, wherein the time intervals for performing the check by each network device are staggered based on a node index value of each network device.

11. The system of claim 9, wherein determining whether the message is received from a control device comprises examining an indicator set by receipt of the message during the time intervals.

12. The system of claim 9, wherein the one network device that becomes the substitute control device for the network is an active network device having a lowest node index value.

13. The system of claim 8, wherein the one network is configured to:

examine a list of network devices connected to the network, wherein the list includes a unique node index that identifies each network device;

determine whether another network device has a lower node index value than the network device; and in response to determining that another network device does not have a lower node index value, maintain operation as the substitute control device for the network.

14. The system of claim 8, wherein the one network device is configured to:

examine a list of network devices connected to the network, wherein the list includes a unique node index that identifies each network device;

determine whether another network device has a lower node index value than the network device; and in response to determining that another network device has a lower node index value, disable operation as the substitute control device for the network.

15. A non-transitory computer readable medium having stored therein instructions for making one or more processors execute a method for controlling a wireless lighting control network, the processor executable instructions comprising instructions for performing operations by a set of network devices, the operations including:

determining whether a message is received from a control device for the wireless lighting control network during a first time interval;

in response to determining that the message from the control device was not received during the first time interval, transmitting a message to other network devices to determine whether any of the other network devices received the message from the control device during the first time interval;

in response to determining, during a second time interval, that the message from the control device was not received and that no indication that the message from the control device was received from another network device, transmitting, by one network device, a message to the other network devices to indicate that the one network device is a substitute control device for the wireless lighting control network; and periodically transmitting, by the one network device, messages to the other network devices indicating that the network device is an active substitute control device for the wireless lighting control network.

16. The non-transitory computer readable medium as defined in claim 15, further comprising instruction for performing operations including:

performing, by each network device, a check to determine whether the message is received from the control device or the substitute control device at time intervals based at least in part on a node index value and a number of network devices in the network, wherein each network device is identified by a unique node index value.

17. The non-transitory computer readable medium as defined in claim 16, further comprising instruction for performing operations including:

staggering the time intervals for performing the check by each network device based on a node index value of each network device.

18. The non-transitory computer readable medium as defined in claim 16, further comprising instruction for performing operations including:

determining whether the message is received from a control device by examining an indicator set by receipt of the message during the time intervals.

19. The non-transitory computer readable medium as defined in claim 16, wherein a network device that becomes the substitute control device for the network is an active network device having a lowest node index value.

20. The non-transitory computer readable medium as defined in claim 15, further comprising instruction for performing operations including:

examining, by the one network device, a list of network devices connected to the network, wherein the list includes a unique node index that identifies each network device;

determining whether another network device has a lower node index value; and in response to determining that another network device does not have a lower node index value, maintaining operation as the substitute control device for the network.

21. The non-transitory computer readable medium as defined in claim 15, further comprising instruction for performing operations including:

examining by the one network device, a list of network devices connected to the network, wherein the list includes a unique node index that identifies each network device;

determining whether another network device has a lower node index value; and in response to determining that another network device has a lower node index value, disabling operation of the first network device as the substitute control device for the network.

\* \* \* \* \*